US005574787A

United States Patent [19]

Ryan

[11] Patent Number: 5,574,787
[45] Date of Patent: Nov. 12, 1996

[54] APPARATUS AND METHOD FOR COMPREHENSIVE COPY PROTECTION FOR VIDEO PLATFORMS AND UNPROTECTED SOURCE MATERIAL

[76] Inventor: John O. Ryan, 22015 Creekside Ct., Cupertino, Calif. 95014

[21] Appl. No.: 279,542

[22] Filed: Jul. 25, 1994

[51] Int. Cl.$^6$ ........................................... H04N 7/167
[52] U.S. Cl. ........................... 380/5; 380/3; 380/10; 360/60; 386/94
[58] Field of Search ................. 380/5, 9, 10, 3; 360/60, 37.1; 358/335

[56] References Cited

U.S. PATENT DOCUMENTS

| | | | |
|---|---|---|---|
| 4,907,093 | 3/1990 | Ryan | 358/335 |
| 5,157,510 | 10/1992 | Quan et al. | 358/335 |
| 5,315,448 | 5/1994 | Ryan | 360/60 |
| 5,323,244 | 6/1994 | Yamaguchi et al. | 358/335 |
| 5,418,853 | 5/1995 | Kanota et al. | 380/15 |

*Primary Examiner*—Thomas H. Tarcza
*Assistant Examiner*—Hrayr A. Sayadian
*Attorney, Agent, or Firm*—Gerow D. Brill

[57] ABSTRACT

A video recording platform prevents both analog and digital copying of copy protected material. The platform may input and output both analog and digital video signals. At said analog input, a detector detects conventional copy protection in the analog input video, and in response disables recording thereof. At the digital input, a first detector detects a copyright signature present in the input material and in response prevents recording. A specially adapted video recorder, playback device or set top decoder copy protects video source material which has a copyright signature. A copyright signature is provided in a predetermined location in said video signal to be protected. The video recorder, playback device, or set top decoder upon detection of the copyright signature on its input or at playback, modifies the output standard (NTSC) video signal with a conventional copy protection process and the digital output with a new copyright signature. The input digital signal may contain a scrambling of the digital video signal in addition to the copy protection signature. In addition, an authenticating signature may be added to the digital video signal and detected as part of the copy protection process. As part of the copy protection, a television receiver includes a copy protection and descrambling system.

43 Claims, 4 Drawing Sheets

APPARATUS AND METHOD FOR COMPREHENSIVE COPY PROTECTION FOR VIDEO PLATFORMS AND UNPROTECTED SOURCE MATERIAL

CROSS REFERENCE TO RELATED APPLICATIONS

This application is related to copending application by John O. Ryan, Ser. No. 08/287,800, filed Aug. 9, 1994, commonly assigned with the present invention.

BACKGROUND OF THE INVENTION

1. Field of the Invention

This disclosure is directed to a copy protection and scrambling method and apparatus for use with various video platforms including, but not limited to: (1) digital video recording, where it is desired to copy protect both an analog and digital video signal associated with a digital recording or playback apparatus; (2) a digital pay per view decoder where it is desired to copy protect a digital video signal received by the decoder; and (3) a digital video disc player, where it is desired to copy protect the digital video signal associated with a digital disk recording. Additionally, the elements of the copy protection and scrambling can be applied to any video material where the original source material is not copy protected;

2. Description of the Prior Art

Progressive improvements in recording head technology, high-speed digital signal processing and videotape formulation now make it feasible to manufacture digital VCRs for consumer applications. A coalition of manufacturers has been convened specifically to promulgate technical standards for digital VCRs for consumer use. A similar effort appears to be under way on a new MPEG-2 digital video disc standard—DVD.

The success of the digital VCR as a consumer product will be decisively influenced by video software suppliers' decisions to support it by releasing movies and other quality programming in the format. The extremely high picture quality potential of digital VCRs coupled with their ability to make endless perfect copies, represent a serious psychological obstacle to many program suppliers, especially the Hollywood studios. As digital VCRs get into the hands of professional and amateur pirates they will be viewed as a major threat to revenues.

To encourage program suppliers to view digital VCRs as an opportunity rather than a threat, a sophisticated copyright protection system that provides a high level of security for certain copyrighted video programs is needed. This needs to be accomplished without in any way compromising the consumers' ability to use these digital VCRs for legitimate time-shifting and prerecorded program viewing.

Overview of Video Cody-Protection Systems

The various video copy-protection systems implemented or proposed to date have in one way or another attempted to prevent VCRs from making usable copies of certain pre-recorded or transmitted video programs. There are two general classes of such systems—called respectively, unilateral and bilateral copy-protection systems.

Unilateral copy-protection systems: as described in U.S. Pat. No. 4,631,603 issued Dec. 23, 1986, to John O. Ryan and assigned to Macrovision; U.S. Pat. No. 4,914,694 issued on Apr. 3, 1990 to Leonard and assigned to Eidak Corp.; and U.S. Pat. No. 4,577,216 issued Mar. 18, 1986, to John O. Ryan and assigned to Macrovision; are systems designed to work with large pre-existing installed bases of VCRs and TV sets. The designer of a unilateral system must identify and exploit some basic difference between the way these pre-existing VCRs and TV sets utilize the video signal. Since the pre-existing VCRs were designed to be able to record all video signals conforming to the standard in use (e.g. NTSC or PAL), unilateral copy-protection systems therefore must generate non-standard video signals. The requirement that these non-standard copy-protected video signals be playable on all existing VCRs and TV sets places such severe design constraints on unilateral systems that a level of effectiveness much above about 80% is very difficult to achieve.

Various well known copy protection schemes for video signals include that disclosed in U.S. Pat. No. 4,631,603, John O. Ryan, Dec. 23, 1986 and assigned to Macrovision, incorporated by reference, directed to modifying an analog video signal to inhibit making of acceptable video recordings therefrom. This discloses adding a plurality of pulse pairs to the otherwise unused lines of a video signal vertical blanking interval, each pulse pair being a negative-going pulse followed closely by a positive-going pulse. The effect is to confuse AGC (automatic gain control circuitry) of a VCR (video cassette recorder) recording such a signal, so that the recorded signal is of poor quality and generally unview able.

Another analog video protection scheme is disclosed in U.S. Pat. No. 4,914,694 issued Apr. 3, 1990, to Leonard, and assigned to Eidak Corp., incorporated by reference. The Eidak system (see Abstract) increases or decreases the length of each video field from the standard length, either by changing the time duration of the respective horizontal line intervals in each field while keeping a constant, standard number of lines per frame, or by changing the number of horizontal line intervals which constitute a frame while maintaining the standard duration of each line interval.

These video protection systems modify the video signal to be recorded (for instance on tape) or to be broadcast (for instance pay-per-view television programs) to make copying by ordinary VCRs difficult or impossible. When a video tape, on which is recorded the copy protected video signal, is played back for viewing using a VCR, the copy protection process is essentially transparent, i.e., it does not interfere with viewing. However, any attempt made to copy the video signal from the tape using a second VCR to record the output of the first (playback) VCR yields a picture degraded to some extent, depending on the efficacy of the particular copy protection system. These present video copy protection systems protect only analog video signals which are the type of video signals broadcast and recorded using current consumer video technology.

Bilateral copy-protection systems, on the other hand, require that a special detector circuit be included in essentially all VCRs conforming to the standard. Bilateral systems therefore represent a viable alternative to unilateral systems only if they are implemented at the introduction of a new format. This detector circuit searches for a special copy-disable signal embedded in protected pre-recorded or transmitted video signals and on finding it, causes the VCR to stop recording. Bilateral copy-protection systems can be designed to be essentially 100% effective. For this reason they are preferred by copyright owners over unilateral systems.

However for a bilateral system to have maximum value, it must be designed in as an integral part of a new VCR format and the special detector circuit must be included in all manufactured VCRs. There may be legal or contractual difficulties in ensuring the cooperation of all VCR manufacturers. If non-compliant VCRs are manufactured, these surely will be purchased by some video store owners and professional video pirates, and will be used to make illicit copies of protected programs to be sold or rented. This necessity of ensuring the cooperation of 100% of VCR manufacturers is a weakness of all bilateral copy-protection systems proposed to date.

Future of Digital Recording

It is widely believed that digital video tape recorders will soon be commercially available for consumer use. To maintain compatibility with analog video broadcast signals and analog video tape recorders, it is likely that at least the first generation of consumer digital video tape recorders will be "hybrid" digital and analog systems. Such systems will have the capabilities of current analog video cassette recorders to record from an analog input signal and provide an analog output signal on playback, while still having equivalent digital capabilities. Thus these new hybrid digital tape recorders will have the capability internally to convert input analog signals into digital signals, and record the digital signals as a digital data stream on the tape. During playback the digital data stream from the tape will be available both as a digital signal for display by a digital television set (also not currently available) or be reconverted within the hybrid video tape recorder to a conventional analog video signal (such as the NTSC signal used in the United States.) The capability of the system internally to convert the received analog signals to a digital data stream will be important because currently there are no sources (either tape or broadcast) of digital video program material available to consumers.

Such hybrid video recorders will likely employ a "consumer" digital recording format differing from the standards of present professional digital systems. This consumer digital video format is not yet established. Such digital video recorders will likely include a conventional "front end" RF tuner and also an RF modulator on the output side, as do present conventional analog VCRs. (By analog video here is meant NTSC, PAL, SECAM or Y/C.) The digital recording standard for consumers is likely to be essentially a data structure that represents the video signal as a stream of (binary) data bits along with suitable error concealment encoding, together with a physical tape standard.

Also well known are professional digital video tape recorders, although currently such digital video tape recorders (which both record and play back digitally) are available only for the professional market, due to their high cost. Such digital systems trade distortion-free performance for substantially higher bandwidth, i.e. substantially more information must be recorded per video frame. The advantage to the user of a digital recorder is that so long as the signals are recorded and played back in the digital domain, each successive generation of copies is without any significant reduction in picture quality. This is unlike the case with conventional analog recording technology. Current digital video recorders (not intended for consumer purposes) a use the so-called "D-1", "D-2" or "D-3" video recording standards and require special video tape.

Problems Posed by Digital Recording

Since digital video tape recorders will be capable of high fidelity reproduction which in turn will encourage copying, it is important that such recorders for consumer use be designed to inhibit or discourage unauthorized recording. For instance it is important to prevent use of recorders for illegally duplicating copyrighted video material, and also to prevent playing back of such illegally duplicated material. Currently available analog video copy protection techniques are not useful in the digital domain. Hence there is a need for a new copy protection system suitable for use with such hybrid digital and analog video tape recorders, where the material recorded on the tape is a digital data stream. A typical situation to be prevented is use of a hybrid video tape recorder to copy an output signal from a conventional VHS VCR, where the tape played back from the VHS VCR has a conventional copy protection process applied to it. The problem is to prevent the new hybrid digital-analog video tape recorder from copying the material from such a tape. Otherwise, the existence of such hybrid recorders would encourage copyright infringement.

Some of the problems cited above were solved by U.S. Pat. No. 5,315,448, issued May 24, 1994, issued to Ryan and assigned to Macrovision Corporation, incorporated by reference.

The Problem

The digital VCR represents a potential threat to video copyright owners in three ways:

1. Its ability to make high-quality copies of existing analog video programs (NTSC or PAL), whether from pre-recorded videocassettes, laser discs or cable PPV decoders.

2. Its ability to perfectly replicate pre-recorded digital videocassette or make perfect copies of digital video programs from future DVD players, or from PPV decoders with digital video outputs.

3. Its ability to provide near studio-quality analog video outputs from digital pre-recorded videocassettes, which can therefore be copied by existing VHS and 8 mm VCRs. The quality of these analog copies will be comparable to that of today's original VHS releases.

SUMMARY OF THE INVENTION

A video platform that records digitally provides copy protection in both the digital and analog domains. The copy protection includes scrambling and descrambling circuitry. For externally supplied analog video, the recorder detects the presence of copy protection and in response disables recording. For externally supplied digital video, anticopy bits are detected to disable recording. A scrambling process is done in the digital portion as part of the copy protection system. For playing back of recorded material, the presence of anticopy bits is detected in the digital playback video, and the digital playback video upon being converted to an analog signal is modified by an analog video copy protection process. Descrambling circuitry is activated when the playback system detects the anticopy bits. In order to protect the digital output of the recorder, a new set of copy protection data and scrambling is added to the digital output device. The digital receiver contains a simplified descrambling device.

Analog or digital source video material (either prerecorded or from an external source) is provided with a Copy Protection Signature. Detection of the signature and (2) prevent later copying by a second digital recorder by a playback device results in modification of the played back standard video signal with an analog copy protection process. This is suitable for playback devices where the source video cannot be copy protected, but a standard (NTSC or PAL) video signal is provided of a played-back recording.

The principal features of the apparatus and method are:

1. All digital video signals to be copy-protected contain a 1-bit dynamic Copyright Signature in the serial data stream and are also scrambled in the digital domain, using a scrambling technique described in copending application Ser. No. 08/287,800 by John O. Ryan, filed on Aug. 9, 1994. While details of this scrambling technique are described in the copending application discussed above, a detailed knowledge of the technique is not necessary for a full appreciation of the present invention. The 1-bit Copyright Signature also carries a part of the descrambling information.

2. Two scrambling algorithms are used, which we call A and B. Both use the same scrambling principle referred to earlier. All copy-protected programs, whether released on digital videocassettes, or future DVD or digital PPV formats or other platform, are scrambled at the point of origination using algorithm "A". Only compliant devices (those devices that use the method and techniques of the instant invention)—digital VCRs, DVD players or PPV decoders with digital outputs—contain "A" descramblers, which provide clear digital video for internal use and for conversion to analog NTSC or PAL for use externally on existing TV sets.

The purpose of the "A" scrambling feature is to ensure that copy-protected digital video media can only be played on compliant hardware, which also always applies copy-protection to the outputs for copy-protected programs.

3. These compliant machines also contain "B" scramblers which re-scramble the clear digital video before feeding it to their respective digital video output terminals. A new dynamic Copyright Signature bit is also added, to provide the appropriate "B" descrambling information.

The purpose of the "B" scrambling feature is to ensure that the Copyright Signature, as will be discussed more fully below, prevents compliant digital VCRs from making copies. The Copyright Signature cannot be removed by "black boxes", because in so doing, the black boxes would also remove the descrambling information which is partially carried by this Copyright Signature.

4. Future TV sets with digital video inputs complying with the signals disclosed, will contain "B" descramblers to provide clear pictures from protected video sources.

5. Programs released on protected digital pre-recorded media only, also carry a unique Authenticating Signature. The purpose of the Authenticating Signature is to provide a means by which compliant VCRs can determine if the cassette being replayed is a copy of a protected program, in which case the playback signal is interrupted, or the machine's "STOP" mode is activated.

The operating principle is as follows: The authenticating system within compliant VCRs looks for a Copyright Signature in the off-tape digital signal and if present, will permit the cassette to continue playing only if an Authenticating Signature is also detected. Only original, protected digital videocassette contain an Authenticating Signature, added during manufacture. The characteristics of this signature are such that it is not present in the output signal of the VCR used for playback and consequently will not be transferred to any copies made from protected videocassettes. However, copies of all protected digital programs, whether from videocassettes, videodisks or Pay Per View decoders will still contain a Copyright Signature. The absence of an Authenticating Signature on such copies will therefore reveal their illicit nature and the authenticating system in compliant VCRs will not allow them to be played.

6. Digital VCRs using this method also contain the following subsystems:

a. A Copyright Signature Detector on the digital video input these signatures.

b. An Anticopy Process detector on the analog video input terminals, which prohibits these VCRs from recording standard copy-protected programs.

c. A Pay Per View Anticopy Process signal generator which copy-protects the analog output whenever a Copyright Signature is detected on the off-tape signal.

d. A logic system which stops the VCR from playing cassettes containing a Copyright Signature but missing an Authenticating Signature (signifying an illicit copy).

The purpose of the copy-protection and scrambling apparatus and method disclosed is to provide concerned copyright owners with a substantial degree of protection against each of these threats, without in any way limiting the digital VCRs legitimate applications.

BRIEF DESCRIPTION OF THE DRAWINGS

FIG. 1 is a block diagram of a hybrid digital video recorder in accordance with the present invention.

FIG. 2 is a block diagram of digital video disc player in accordance with the present invention.

FIG. 4 is a block diagram of a digital television set in accordance with the present invention.

DETAILED DESCRIPTION OF THE INVENTION

FIG. 1 is a simplified block diagram of a compliant digital VCR, showing how the copy-protection and scrambling functions is implemented.

Each block includes conventional elements currently commercially available or readily constructed by one of ordinary skill in the art in accordance with the following description. The one possible exception is Recording and Playback System 10 which is the main subsystem of such a device. Presently available professional digital video recorders include such tape deck mechanics and electronics. However they are designed for recording and playback of material under current professional-type digital video standards. Recording and Playback System 10 may be of the kind included in such present commercial professional systems. However, since it is envisioned that the hybrid system shown in FIG. 1 is chiefly (but not exclusively) intended for consumer use, such a system will likely include different digital tape deck mechanics and electronics, of a type suitable for large scale production at low cost and designed in accordance with consumer digital video format(s) not yet determined.

In any case, the recorder of FIG. 1 can be constructed of presently available components including a professional type digital tape deck as now commercially available form various companies. The tape to be played on tape deck 10 is in the form of (1) a video cassette or (2) reel-to-reel recording.

The recorder of FIG. 1 is a hybrid device capable of accepting at input terminal A a conventional analog video signal. Also shown in FIG. 1 on the "Inputs" side is digital video input terminal D for receiving digital video from an external source. Terminal D receives a broadcast digital video signal when in the future such signals are commercially broadcasted, or from another digital video tape recorder, digital playback device or cable box.

An analog video input signal such as a NTSC, PAL or Component video signal 12 is applied to a Anticopy Process Detector 26 that detects an anticopy signal such as the Macrovision Corporation anticopy signals described in U.S. Pat. Nos. 4,631,603 and 4,577,216 discussed above. If this analog input signal is copy-protected, Detector 26 generates a logic signal which opens Switch 16 and inhibits recording of the signal. If the analog input is not copy-protected, the video is passed to Analog-to-Digital Converter 18 and then to the Input Selector Switch 30. Such a detection circuit is described in U.S. Pat. No. 4,907,093 issued Mar. 6, 1990 to John O. Ryan and assigned to Macrovision Corporation incorporated by reference.

Since the apparatus of FIG. 1 records a digital signal, the analog video signal at terminal 12 is converted to the desired digital format by Analog to Digital Converter 18. Such analog to digital converters are well known in the video field, and the construction details of Analog to Digital Converter 18 are determined by the nature of the digital recording format(s) compatible with Recording and Playback System 10.

The digital video data stream output from analog to digital converter 18 is provided (via Switch 30) to Recording and Playback System 10. The person (or machine) operating the recorder of FIG. 1 decides whether at any one time he/she is recording Analog Video Input Signal 12 or Digital Video Input Signal 14. Switch 30 (either automatic or manually controlled) chooses from which signal 12 or 14 the tape deck 10 receives the input signal to be recorded.

Digital Video Input Signal 14 is applied to Copyright Signature Detector 20. If the digital input signal is copy-protected, Detector 20 generates a logic signal that opens Switch 22 and prohibits recording of the digital video input signal 14. If the digital input is not copy-protected, it is passed directly to Input Selector Switch 30.

The output of Switch 30 is applied to Record and Playback System 10, of the digital VCR. Details of the Recording and Playback system are not relevant to the copy protection system and will not be described in detail.

The recorder of FIG. 1 may conventionally be provided with an RF tuner (not shown) on the "inputs" side to extract video (NTSC or PAL) from an RF modulated video (TV) signal. Similarly on the "output" side, an RF modulator (not shown) may be provided to convert the baseband or other video signal to an RF modulated video signal (TV), for connection to the antenna input terminal of a television set.

On playback, the demodulated, error-corrected off-tape digital signal on line 31 is applied to Copyright Signature Detector 32, which generates a Logic High 46 if the off-tape signal is copy-protected. Note that Detectors 20 and 32 are functionally identical and one unit, appropriately switched, may be used in practice.

The Authenticating Signature described above can be conveniently and easily realized by frequency-modulating the recorded serial digital signal using a square wave whose frequency is such that an integral number of complete tracks are recorded during each half cycle of this spare wave. The required deviation can be quite small, perhaps one percent or so. Thus, for example, for one complete track the recorded signal might be clocked at one percent above average rate and for the next complete track the signal would be clocked at one percent below average rate. During playback, this modulation can easily be extracted from the error signal of a voltage controlled oscillator or frequency discriminator tracking the off-tape signal.

The advantage of using a modulation frequency such that an integral number of complete tracks are recorded during each half cycle thereof, is that a relatively small modulation can then easily be detected in the presence of the unavoidable frequency modulation "noise" caused by non-uniform head-to-tape scanning velocity, tape stretch etc. This noise is mainly at the track frequency and harmonics thereof and can be easily rejected by sampling or filtering.

Since the off-tape signal is reclocked with a stable clock as part of the normal demodulation process, this Authenticating Signature is effectively "lost" in the machine's demodulation and error correction system, is therefore not present in the digital video output of the VCR and will not be transferred to any copies made. It can readily be detected however, as explained earlier, to authorize playback of original copy-protected cassettes.

Such an off-tape modulation of the digital video signal carries an Authenticating Signature to a third signal detector for that is applied to Decoder 38, the output of which is applied to Authenticating Signature Detector 40. An Authenticating Signature is always created when the tape duplicator or person recording the tape adds a Copyright Signature Signal during the mastering process. Authenticating Detector 40 generates Control Signal 42 as a logic high when an Authenticating Signature is detected.

The logic signals on lines 46 and 42 are applied to Authenticator 44 whose output signal 36 controls Switch 34 according to the following rules:

1. If a Copyright Signature is not detected by Copyright Signature Detector 32, Switch 34 is held closed and the digital video signal at 31 is passed on to the next stages.
2. If a Copyright Signature is detected by Copyright Signal Detector 32, Switch 34 is held closed only if an Authenticating Signature is also detected by Authenticating Signature Detector 40.

Authenticator 44 therefore only allows originals of copy-protected digital videocassettes to play.

The digital video signal at 48, from Switch 34, is applied to one input of Selector Switch 50 and is also applied to the input of "A" Descrambler 52 whose output is applied to the other input of Switch 50.

The copy-protected digital videocassettes are scrambled during manufacture using algorithm "A" as will be described below. Switch 50 is therefore configured to select the output of "A" Descrambler 52 when Logic High 46 is generated by Copyright Signal Detector 32 (signifying a copy-protected program). Otherwise Switch 20 selects the direct digital video signal 48.

"A" Descrambler 52 uses a Copyright Signature Output 51 of Copyright Signature Detector as a descrambling control signal. Therefore, if no Copyright Signature is present in Digital Signal 31, no descrambling takes place or is needed. The digital video output signal, 56, from Switch 50 is applied to one input of Selector Switch 66 and to the input of "B" Scrambler 70 whose output is applied to the other input of Switch 66.

The copy-protected descrambled digital video from compliant sources is scrambled using algorithm "B". Switch 66 is therefore configured to select the output of "B" Scrambler 70 whenever a Copyright Signature is detected by Copyright System Detector 32. As indicated above, a new dynamic Copyright Signature bit is also added to "B" scrambling information by a Copyright Bit Adder 102. The output of Selector Switch 66 is the final digital video output signal 68 from the digital VCR.

The clear or descrambled digital video signal 56 is also applied to Digital-to-Analog Converter 60. The output of Digital Analog Converter 60 is coupled to Color Encoder 62 that generates NTSC or PAL video signals for output on analog output line 64.

Logic High 46 that signifies the presence of a Copyright Signature also switches on an Analog Copy-Protection (ACP) Signal Generator 58, which is interconnected with Encoder 62, thereby copy-protecting the analog output of the digital VCR when copy-protected cassettes are played.

It is clearly essential that this copy-protection system should not be capable of being defeated by a technically knowledgeable person opening up the VCR and making some modifications. Circuit integration and signal distribution decisions should be made with this in mind.

FIG. 2 is a simplified block diagram of a compliant Digital Video Disc player, showing how the copy-protection functions could be implemented. Note that the section of this diagram within the dotted line 100 is virtually identical to the equivalent section of FIG. 1. The only difference is that the Control or Pilot Track Decoder 38 of FIG. 1 is replaced by Radial Servo Error-Signal Decoder 72 in FIG. 2.

The authenticating sub-system comprising blocks 72, 40, 44 and 34 of FIG. 2 allows the techniques described above to be extended to protect against the eventuality that Compact Disc Recorders (CDRs) will become generally available and be capable of making perfect copies of pre-recorded optical discs. Digital Video Discs however can have an Authenticating Signature impressed by radially modulating the writing head by a few tens of nanometers peak-to-peak, as described in copending application 08/267635 by Ryan filed Jun. 29, 1994. This radial modulation does not affect the program information recorded on the disc and is therefore not passed on to any copies made by CDRs. The absence of this radial modulation on discs with Copyright Signatures therefore indicates that the disc is an illicit copy causing switch 34 to open and therefore prohibits replay. The Digital Video Disc system can also use the modulation of the digital video system described for a digital video tape medium above.

The purpose and operation of the remaining parts of FIG. 2 are identical to those of the corresponding parts of FIG. 1.

Figure 3:
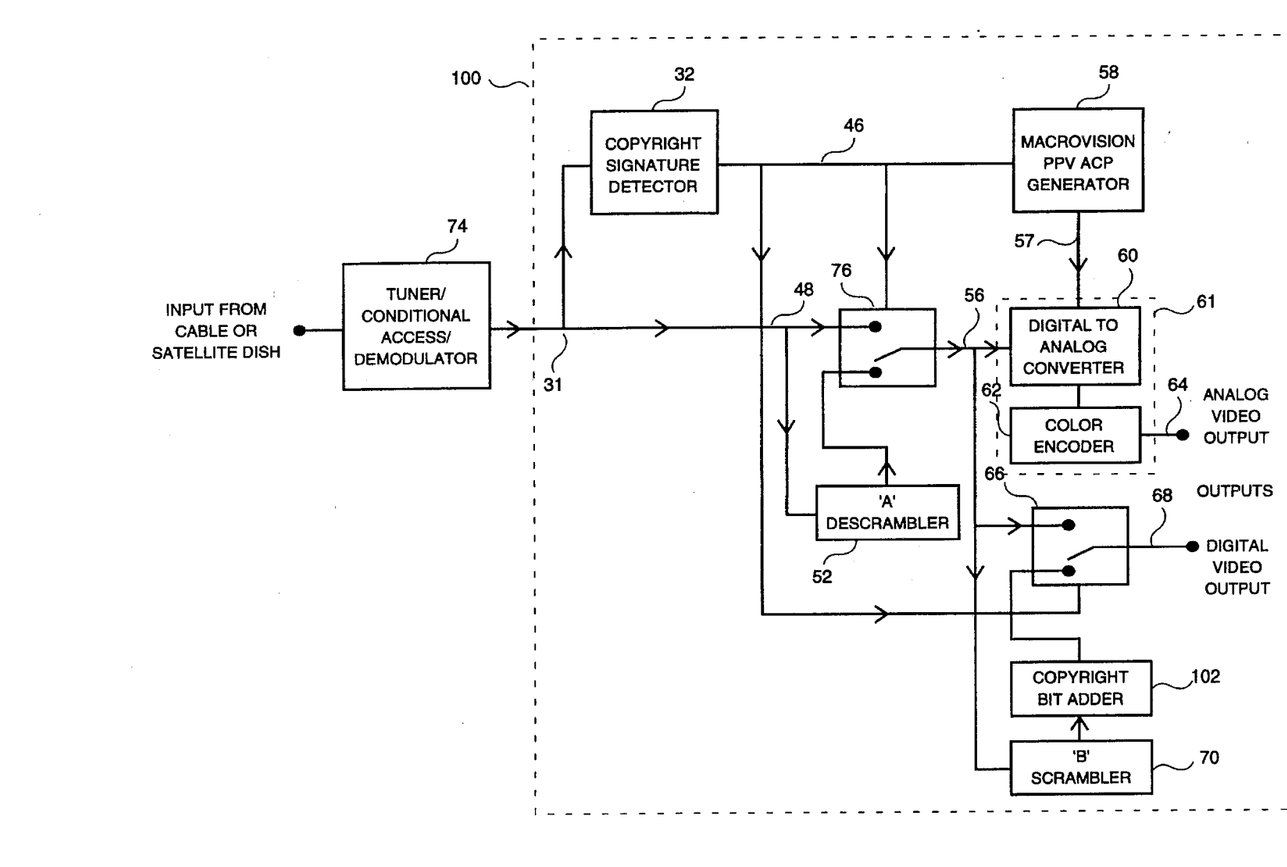
FIG. 3 is a block diagram of digital video pay per view decoder in accordance with the present invention.

FIG. 3 is a simplified block diagram of a compliant Digital PPV Decoder, showing how the copy-protection functions could be implemented. Note that this diagram is similar to FIG. 2, except the authenticating sub-system blocks 72, 40, 44 and 34 of FIG. 2 are not needed, since there is no physical media to authenticate. The purpose and operation of the remaining parts of FIG. 3 are identical to those of the corresponding parts of FIGS. 1 and 2.

FIG. 4 is a simplified block diagram of a compliant TV set with a digital video input signal.

Digital Video Input Signal 78 is applied directly to one input of Selector Switch 86 and to the input of "B" Descrambler 80, whose output 96 is applied to the other input of Switch 86.

Copyright Signature Detector 82 is also fed Digital Video Signal 78 and its Logic Level Output 84 controls Switch 86, such that Switch 86 selects Digital Video Signal 78 in the absence of a Copyright Signature and Descrambled Signal 96 from "B" Descrambler 80 when a Copyright Signature is detected. "B" Descrambler uses Copyright Signature as a descrambling control signal. Therefore, if no copyright signal is present in Digital Video Signal 78, no descrambling takes place. The output of Switch 86 on line 95 is therefore in all cases, clear or descrambled video capable of being displayed by the TV set and is connected to one input of Display Selector Switch 90.

Analog Video Signal 98 is inputted to the TV set on line and to the other input of Switch 90. The output of Switch 90, 92 is applied to Display Electronics and Control 90. Display Electronics and Control 94 uses conventional techniques and need no further discussion for an understanding of the invention.

It is helpful at this point to discuss the performance of the recording and playing back of copy protected and non-copy protected material.

If a user attempts to play an original, non-copy protected videocassette, a Copyright Signature is not detected, so the videocassette is allowed to play normally. Also, if a user attempts to play an original, copy-protected videocassette and the Copyright Signature and the Authenticating Signature are both detected, the video cassette is allowed to play normally.

If a user attempts to play a copy of a non-copy-protected program (regardless of the medium from which it originated), a Copyright Signature is not detected, so this videocassette is allowed to play normally.

If a user attempts to play an illicit.copy of an copy-protected program (regardless of the medium from which it originated) the Copyright Signature is detected because this signature is passed on to all copies, regardless of the number of generations or whether the copying machine was compliant or not. The Authenticating Signature, however, is not passed on to copies. The decision circuit in the VCR therefore does not allow this copy to be played.

Even if VCR manufacturers made non-compliant digital VCRs, the copy protection method and apparatus, described herein, would continue to be viable. The owners of non-compliant VCRs would be able to play only illicit copies of protected programs for their own use. Such copies would not play on any of the compliant digital VCRs, which presumably would be in the majority. Dishonest video store operators and other video pirates could not use these non-compliant VCRs to engage in piracy, because illicit copies could only be played on non-compliant VCRs. The pirate would have to advertise his product as capable of being played only on the small subset of non-compliant VCRs, thereby attracting attention and risking copyright infringement suits.

A non-compliant VCR is not able to play original copy-protected videocassettes because the absence of the "A" descrambler in a non-compliant VCR would prohibit it from descrambling protected videocassettes. This should greatly limit the market for such machines.

A "black box" to defeat the copy protection that removes the Copyright Signature is not viable. The absence of the Copyright signature would make it impossible for TV sets to descramble and display this digital video.

The above description is illustrative and not limiting. Further modifications will be apparent to one of ordinary skill in the art in light of this disclosure. It is to be understood that while at present consumer type digital video recording devices are not available, that digital video professional systems are now available, and the above-described apparatus and method are readily adaptable to such presently commercially available digital video recorders.

TABLE 1

PLAYBACK OF ORIGINAL PRE-RECORDED DIGITAL VIDEOCASSETTES

| | PLAYBACK VCR | | | |
|---|---|---|---|---|
| | Compliant Digital VCR | | Non-Compliant Digital VCR | |
| Cassette Type | Analog Output | Digital Output | Analog Output | Digital Output |
| Encoded | Copy protected output, viewable on all regular TVs | Copy protected output, viewable on future TVs with digital inputs | Scrambled, unwatchable output | Scrambled, unwatchable output |
| Non-Encoded | Unprotected output, viewable on all regular TVs | Unprotected output, viewable on future TVs with digital inputs | Unprotected output, viewable on all regular TVs | Unprotected output, viewable on future TVs with digital inputs |

TABLE 2

PLAYBACKS OF COPIES MADE FROM ENCODED DIGITAL VIDEO

| | | PLAYBACK VCR | | | |
|---|---|---|---|---|---|
| Digital Video | Copy Made | Compliant Digital VCR | | Non-Compliant Digital VCR | |
| Source | By | Analog Output | Digital Output | Analog Output | Digital Output |
| Compliant digital VCR, digital video disc player | Compliant Digital VCR | No output (blank copy) | No output (blank copy) | No output (blank copy) | No output (blank copy) |
| | Non-Compliant Digital VCR | No output | No output | Scrambled unwatchable output | Copy-protected output viewable on future TVs with digital inputs |
| Non-compliant digital VCR, digital video disc player | Compliant Digital VCR | No output (blank copy) | No output (blank copy) | No output (blank copy) | No output (blank copy) |
| | Non-Compliant Digital VCR | No output | No output | Scrambled unwatchable output | Scrambled unwatchable output |

TABLE 3

PLAYBACK OF COPIES MADE FROM COPY-PROTECTED[1] VHS, OR 8 MM ANALOG VIDEO[2] SOURCE

| | PLAYBACK VCR | | | |
|---|---|---|---|---|
| | Compliant Digital VCR | | Non-Compliant Digital VCR | |
| Copy Made By | Analog Output | Digital Output | Analog Output | Digital Output |
| Compliant Digital VCR | No output (blank copy) | No output (blank copy) | No output (blank copy) | No output (blank copy) |
| Non-Compliant DigitalVCR | Unprotected output, viewable on all regular TVs | Unprotected output, viewable on future TVs with digital inputs | Unprotected output, viewable on all regular TVs | Unprotected output, viewable on future TVs with digital inputs |

[1]Protected by Macrovision's standard videocassette anticopy process
[2]Protected by Macrovision's standard pay-per-view anticopy process at the analog-out port of a digital-set-top decoders

I claim:

1. An apparatus for playing back material digitally recorded on a recording medium, comprising:

a mechanism for playing said recording medium;

a digital output terminal operatively connected to said mechanism for providing a digital data signal from said mechanism;

a first detector for detecting an authenticating signal within said digital data signal;

a second detector for detecting a copyright signature signal within said digital data signal;

wherein said copyright signature signal, when present, and said authenticating signal, when present are coupled to an authenticator;

when both said authenticating signal and said copyright signature signal are coupled to said authenticator, said authenticator couples a command to activate a first switch;

said activation of said first switch couples said digital data signal to a first input of a second switch and a descrambler;

a descrambled output of said descrambler is coupled to a second input of said second switch;

said copyright signature signal is also coupled to a control element of said second switch so as to couple said output of said descrambler to a digital to analog converter, a first input of a third switch and a scrambler;

an output of said scrambler is coupled to a second input of said third switch;

an output of said third switch couples a scrambled output when said copyright signature signal is present and couples a clear digital data signal when said copyright signature signal is present;

said copyright signature signal activates an analog anticopy generator;

a digital to analog converter is operatively connected to an output of said second switch containing clear digital data when said copyright signature signal is present on said control element of said second switch and descrambled digital data when said copyright signature signal is present on said control element of said second switch;

said digital to analog converter converts said digital signal to an analog signal;

said analog output is encoded into a composite video signal;

said anticopy generator couples an analog anticopy signal and modifies said analog signal outputted by said digital to analog converter and said encoder.

2. The apparatus of claim 1, wherein said digital signal and analog signals are video signals.

3. The apparatus of claim 2, wherein said copyright signature signal is at least one bit at a predetermined location in said digital signal.

4. The apparatus of claim 2, wherein said generated anticopy signal includes a pulse pair inserted into at least some blanking intervals of said analog video signal, each pulse pair including a positive going pulse and a negative going pulse.

5. The apparatus of claim 1, wherein said recording medium is magnetic tape.

6. The apparatus of claim 1, wherein said recording medium is an optical disk.

7. The apparatus of claim 2, wherein said generated anticopy signal includes pulses added to blanking intervals of said analog video signal.

8. The apparatus of claim 2, wherein said generated anticopy signal includes alterations of said time durations of h horizontal line intervals in said analog video signal.

9. The apparatus of claim 2, wherein said generated anticopy signal includes alteration of said number of horizontal line intervals per video frame.

10. The apparatus of claim 3, wherein said one bit is in each field of said digital video signal.

11. The apparatus of claim 1, wherein said authenticating signal comprises:

a frequency modulation of said digital signal.

12. The apparatus of claim 11, wherein said frequency modulation of said authenticating signal comprises:

said modulation signal is a square wave whose frequency is such that an integral number of complete tracks are recorded during each cycle of said square wave.

13. The apparatus of claim 1, wherein said mechanism is also a recording mechanism, and further comprising:

a digital input terminal for receiving a digital input signal from an external source;

means for providing said digital input signal to said mechanism, for recording said digital input signal on said recording medium;

a third signal detector for detecting copy protection information present in said digital input signal; and means for inhibiting recording in response to detection of said copy protection information present in said digital input signal.

14. The apparatus of claim 13, wherein said digital input signal is a video signal.

15. The apparatus of claim 13, further comprising a tuner for deriving said digital input signal from a modulated RF signal.

16. Said apparatus of claim 13, further comprising:

an analog input terminal for receiving an analog input signal;

an analog to digital converter for converting said analog input signal to a converted digital signal;

means for providing said converted digital signal to said mechanism; and an analog signal detector for detecting an analog copy protection signal present in said analog input signal and in response thereto inhibiting recording of said analog input signal.

17. The apparatus of claim 16, wherein said means for providing said converted digital signal to said mechanism are included in a switch for receiving said digital input signal and said converted digital signal and providing one or said other to said mechanism, depending on a connection established by said switch.

18. The apparatus of claim 16, wherein said analog signal detector includes an automatic gain control circuit responsive to said analog copy protection signal.

19. The apparatus of claim 16, wherein said analog signal detector includes a circuit responsive to said analog copy protection signal.

20. Said apparatus of claim 16, wherein said analog signal detector includes means for detecting said analog copy protection signal and generating a recording inhibiting signal in response.

21. Said apparatus of claim 13, wherein said second signal detector detects at least one bit in a predetermined location in said digital input signal.

22. A method for inhibiting copying of material digitally recorded on a recording medium, said material including copy protection information, comprising said steps of:

playing said material from said recording medium;

providing a digital data signal from said medium;

detecting an authenticating signal within said digital data signal;

detecting said copy protection information including any scrambling of said played material;

processing said digital data signal when both an authenticating signal and a copyright signature are present;

descrambling said copy protected digital signal;

converting said played material from a digital signal to an analog signal;

generating an analog copy protection signal in response to said detected copy protection information; and modifying said analog signal with said generated analog copy protection signal;

outputting a copy protected analog signal;

adding a new copy protection signal to said descrambled signal and rescrambling said descrambled digital signal; and outputting said rescrambled digital video signal containing a new copyright signature signal.

23. The method of claim 22, wherein said digital signal and analog signals are video signals.

24. The method of claim 23, wherein said copy protecttion information is at least one bit at a predetermined location in said digital signal.

25. The method of claim 23, wherein said copy protection information includes a scrambling portion of said video signal.

26. The method of claim 23, wherein said authenticating signal comprises:

a frequency modulation of said digital signal.

27. The method of claim 26, wherein said frequency modulation of said authenticating signal comprises:

modulating said modulation signal with a square wave whose frequency is such that an integral number of complete tracks are recorded during each cycle of said square wave.

28. Said method of claim 23, wherein said generated signal includes a pulse pair inserted into at least some blanking intervals of said analog video signal, each pulse pair including a positive going pulse and a negative going pulse.

29. Said method of claim 22, wherein said recording medium is magnetic tape.

30. Said method of claim 22, wherein said recording medium is an optical disk.

31. Said method of claim 23, wherein said generated anticopy signal includes alterations of said time durations of horizontal line intervals in said analog video signal.

32. Said method of claim 23, wherein said generated anticopy signal includes alteration of said number of horizontal line intervals per video frame.

33. Said method of claim 23, wherein said one bit is located in each field of said digital video signal.

34. The method of claim 22, wherein said material is also recorded and further comprising:

receiving a digital input signal from an external source;

providing said digital input signal for recording said digital input signal on said recording medium;

detecting copy protection information present in said digital input signal; and means for inhibiting recording in response to detection of said copy protection information present in said digital input signal.

35. The method of claim 34, wherein said digital input signal is a video signal.

36. The method of claim 34, further comprising deriving said digital input signal from an RF signal.

37. The method of claim 34, further comprising:

receiving an analog input signal;

converting said analog input signal to a converted digital signal; and detecting an analog copy protection signal present in said analog input signal and in response inhibiting recording of said analog input signal;

coupling said converted digital signal to a recording mechanism in the absence of a copy protection signal.

38. Said method of claim 34, further comprising:

providing a switch for receiving said digital input signal and said converted digital signal; and recording one or said other signal depending on a connection established by said switch.

39. Said method of claim 36, wherein said analog signal detecting includes providing an automatic gain control circuit directly responsive to said analog copy protection signal.

40. Said method of claim 36, wherein said analog signal detecting includes providing a circuit directly responsive to said analog copy protection signal.

41. Said method of claim 36, wherein said analog signal detecting includes:

detecting said analog copy protection signal; and generating a recording inhibiting signal in response.

42. A method of viewing copy protected video material containing a copy protection signature signal and a authenticating signature signal comprising the steps of:

detecting a first copyright protection signature signal within said video material;

detecting an authentication signal within said video material;

descrambling scrambled portions using said copyright protection signal as a control element when said copyright signature signal and said authenticating signature signal are detected;

adding a second copyright protection signature signal and rescrambling said descrambled video material;

outputting said rescrambled signal to a viewing device;

detecting said second copyright signature signal within said viewing device;

using said second copyright signature signal to descramble said rescrambled signal; and viewing said descrambled rescrambled video signal.

43. An apparatus for receiving a copy protected video signal containing a copyright signature signal and scrambled portions comprising:

a tuner for receiving and demodulating said video signal;

an output of said tuner being operatively coupled to a copyright signature detector, a first input of a first selector and an input of a descrambler;

said descrambler descrambles said video signal when a first copyright signature is present within video signal and outputs a descrambled video signal to a second input of said first selector;

said copy signature detector outputs a control signal to a control element of said first selector, coupling said descrambled video to a digital to analog converter, a first input of a second selector and a scrambler when said first copy protection signature is detected;

said scrambler rescrambles said descrambled video and adds a second copy protection signature;

an output of said scrambler is coupled to a second input of said second selector, wherein when said first copyright signature is present, said second selector outputs said output of said scrambler and when said first copyright signature is not present, said second selector selects said input of said scrambler;

wherein said output of said second selector provides a digital output for said apparatus;

said control signal is coupled to an analog anticopy signal generator to generate one or more analog anticopy signals when said first copyright signature is present;

an output of said digital to analog converter is coupled to analog encoder to produce an analog output signal; and said one or more analog anticopy signals are coupled to said digital to analog converter and encoder to generate an analog output signal containing analog anticopy elements.

* * * * *